United States Patent
Tsirkin

(10) Patent No.: US 10,642,625 B2
(45) Date of Patent: May 5, 2020

(54) BRANCH REWRITING DEVICE FEATURE OPTIMIZATION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 210 days.

(21) Appl. No.: 15/674,891

(22) Filed: Aug. 11, 2017

(65) Prior Publication Data
US 2019/0050236 A1    Feb. 14, 2019

(51) Int. Cl.
  *G06F 9/4401* (2018.01)
  *G06F 8/41* (2018.01)
  *G06F 9/445* (2018.01)
  *G06F 8/52* (2018.01)

(52) U.S. Cl.
  CPC ............ *G06F 9/4411* (2013.01); *G06F 8/443* (2013.01); *G06F 8/4441* (2013.01); *G06F 8/52* (2013.01); *G06F 9/44542* (2013.01); *G06F 9/44552* (2013.01)

(58) Field of Classification Search
  None
  See application file for complete search history.

(56) References Cited

U.S. PATENT DOCUMENTS

| | | | |
|---|---|---|---|
| 6,223,336 B1 | 4/2001 | Tojima | |
| 6,622,300 B1 | 9/2003 | Krishnaswamy et al. | |
| 7,694,063 B1 | 4/2010 | Nandi et al. | |
| 7,941,658 B2 | 5/2011 | Karpa | |
| 8,522,225 B2 | 8/2013 | Chen et al. | |
| 8,943,487 B2 | 1/2015 | Li et al. | |
| 8,990,786 B2 | 3/2015 | Nakaike | |
| 9,448,788 B1 | 9/2016 | Barua et al. | |
| 2006/0005178 A1* | 1/2006 | Kilgard | G06F 8/443 717/153 |
| 2009/0025015 A1* | 1/2009 | Kurabayashi | G06F 8/64 719/327 |
| 2012/0159461 A1* | 6/2012 | Nakaike | G06F 8/4443 717/139 |
| 2013/0139139 A1* | 5/2013 | Mallur | G06F 8/65 717/170 |
| 2014/0075418 A1* | 3/2014 | Bates | G06F 8/4441 717/129 |

OTHER PUBLICATIONS

Definition for "evaluate", online dictionary, 2016 (Year: 2016).*

(Continued)

*Primary Examiner* — Daxin Wu
(74) *Attorney, Agent, or Firm* — Lowenstein Sandler LLP

(57) ABSTRACT

Systems and methods for branch rewriting device feature optimization are disclosed. An example method may include identifying, by a processing device of a computing device, an occurrence of a configuration change associated with a device driver of the computing device, responsive to identification of the configuration change, evaluating one or more devices supported by the device driver and installed on the computing device, determining, in view of the evaluating, that a feature is implemented by each of the one or more devices, the feature corresponding to a conditional branch of the device driver, and responsive to the determining, modifying the device driver to execute an unconditional branch corresponding the feature.

19 Claims, 6 Drawing Sheets

(56) References Cited

OTHER PUBLICATIONS

Definition for "implement", online dictionary, 2016 (Year: 2016).*
Ryzhyk, Leonid et al., "User-Guided Device Driver Synthesis", https://www.usenix.org/system/files/conference/osdi14/osdi14-paper-ryzhyk.pdf, University of Toronto; NICTA; UNSW, Sydney, Australia; Intel Corporation, Oct. 6-8, 214, 17 pages.
Rajagopalan, Mohan et al., "Binary Rewriting of an Operating System Kernel", https://www2.cs.arizona.edu/~hehf/papers/bw.pdf, Department of Computer Science The University of Arizona Tucson, AZ 85721, USA, 8 pages.
Elixir Cross Referencer, "Free Electrons: Embedded Linux Experts", May 16, 2017, 6 pages.

* cited by examiner

BRANCH REWRITING DEVICE FEATURE OPTIMIZATION

TECHNICAL FIELD

The disclosure is generally related to computing systems, and is more specifically related to branch rewriting device feature optimization.

BACKGROUND

Device drivers within operating systems are often written to support multiple device variants. This is especially true for drivers of virtual devices that change and gain features frequently. A typical device driver would need to support a wide range of devices using different feature sets, or even a mix of devices with different feature sets. This results in multiple conditional branches in driver executable code, which can slow down execution of the code.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
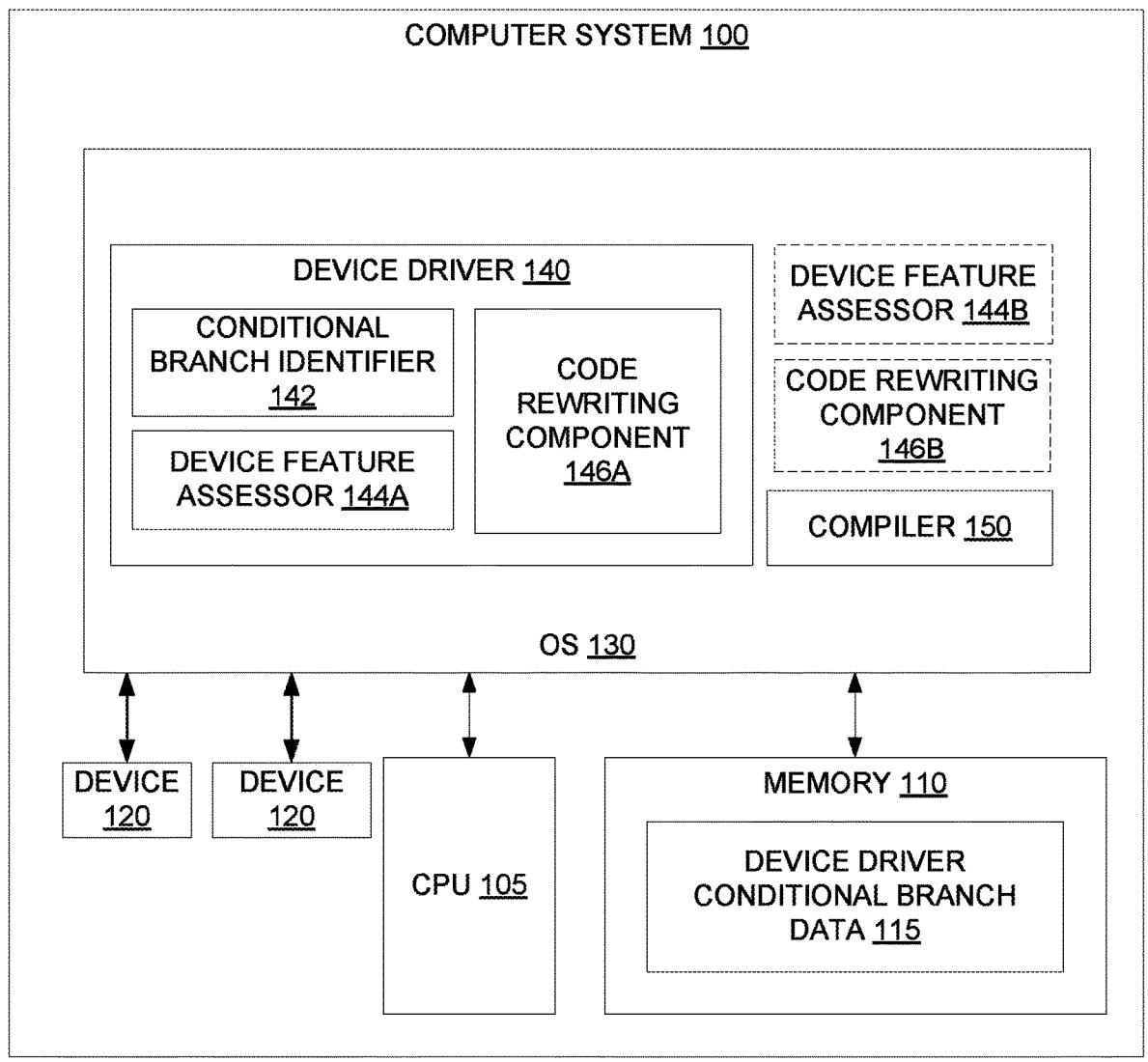
FIG. 1 depicts a high-level diagram of an example distributed computing system in accordance with one or more aspects of the disclosure.

Described herein are methods and systems for branch rewriting device feature optimization. A device driver is a computer program (instructions executable by a processing device on a computer system) that controls a particular type of device that is attached to the computer system. A device driver may be written to be compatible with different versions of a device and, as such, may support multiple different features that can be implemented by the different versions of the device. To provide support for these different features and different versions of a device, a device driver may include conditional branches in code (e.g., source code; instructions written in a programming language) of the device driver. The conditional branch provides for different versions of an executable computer program (also referred to as executable version) of the device driver depending on the particular feature implemented by a supported device in the computer system.

Conventionally, when the device driver initiates, it can examine the supported devices that are currently in operation on the computer system in order to determine which features to enable in the executable version of the device driver code. However, with an increasing number of supported devices and supported features, repeated testing to determine which features to enable in the executable version of device driver code can become time and resource consuming. This results in a degraded performance of the computer system due to slower processor performance and longer latency.

Implementations of the disclosure address the inefficiencies described above by providing an optimization for conditional branches in device driver code via branch rewriting device feature optimization. Implementations of the disclosure identify implemented features for the devices present in a computer system (and supported by the device driver) and optimize conditional branches in code of a device driver based on the implemented features of the devices. If a device driver and/or operating system determine that all devices (supported by a device driver) in a computer system implement a same feature of a conditional branch of the device driver, these sections of code corresponding to the particular conditional branch are re-written to unconditionally use the given feature. If it is determined that the devices implement different features of the conditional branch, then the sections of code are either left unchanged (i.e., as a conditional branch) or re-written to test the particular device feature and execute a branch. Implementations of the disclosure can be used for device drivers that support a mix of features in supported devices, such that a given feature might or might not have a static condition value that is the same between all devices.

Implementations of the disclosure provide a technical improvement over the conventional systems by optimizing executable code of a device driver to implement unconditional branches when a particular feature of the conditional branch is implemented by all devices in a system. As a result, more efficient usage of processing resources and a faster processor speed are provided.

FIG. 1 illustrates a computer system 100 in which embodiments may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," and "computing system" may be used interchangeably and synonymously throughout this document.

Computer system 100 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable branch rewriting device feature optimization through the embodiments discussed herein. Computer system 100 may include hardware components such as a central processing unit (CPU) 105, memory 110, and one or more devices 120. Computer system 100 may include additional or different components, devices, and/or connectors in various implementations of the disclosure. In some implementations, computer system 100 may be connected to a network (not shown), which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

One or more processors may be embodied as CPU 105, which can be a microprocessor, digital signal processor (DSP), or other processing component. CPU 105 may process various received data and may carry out the code or instructions or one or more computer programs, for example, to provide input/output operations specified by the instructions. Devices 120 may include, but are not limited to, peripheral devices (e.g., display, mouse, printer, etc.), peripheral component interconnect (PCI) devices, and/or storage devices used by the computer system 100. Devices 120 may be virtualized as virtual devices for use by one or more virtual machine (VMs) (not shown) hosted by the computer system 100.

A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A VM may function as a self-contained platform, executing its own "guest" operating system and software applications. Typically, software on the host machine known as a "hypervisor" (or a "virtual machine monitor" (VMM)) manages the execution of one or more VMs, providing a variety of functions such as virtualizing and allocating resources, context switching among VMs, backing up the state of VMs periodically in order to provide disaster recovery and restoration of VMs, etc.

Computer system 100 may further include, although not specifically illustrated herein, a system bus or other communications mechanism for communicating information data, signals, and information between various components (e.g., devices 120, memory 110, etc.) of the system 100. System bus may be utilized to connect one or more attached devices 120 or other components. System bus may transfer data between components inside the system 100 utilizing one or more connections, such as parallel or serial bit connections.

Memory 110 may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). It should be noted that the fact that a single CPU is depicted in FIG. 1 for the computer system 100 is merely illustrative, and that in some other examples the computer system 100 may comprise a plurality of CPUs. Similarly, in some other examples computer system 100 may comprise a plurality of storage devices, rather than a single storage device.

CPU 105 may execute an operating system (OS) program 130 (referred to herein as OS 130), as well as sub-programs and/or applications of the OS 130 to provide various features and embodiments described herein. The OS 130 may further include one or more device drivers 140. It should be noted that the fact that a single device driver 140 is depicted in FIG. 1 for the computer system 100 is merely illustrative, and that in some other examples the computer system 100 may comprise a plurality of device drivers 140. Device driver 140 may be a computer program that operates or controls a particular type of device 120 that is attached to the computer system 100. The device driver 140 provides an interface to the attached devices 120, enabling the OS 130 and other applications to access functions of the attached device 120 without having to know the precise details of the attached devices 120 being used. The device driver 140 can handle input by attached devices 120 and/or output data to the attached device 120 for processing.

Implementations of the disclosure provide a branch rewriting device feature optimization for device drivers 140 of computer system 100. A device driver 140 of implementations of the disclosure may provide for dynamic conversion of conditional branches in the code of the device driver to unconditional branches. This dynamic conversion is based on features currently-implemented by supported devices 120 in the computer system 100. The device driver 140 can include a conditional branch identifier 142, a device feature assessor 144A, and a code rewriting component 146A. In some implementations, functionality of the device feature assessor 144A and code rewriting component 146A are implemented outside of the device driver 140 and as part of the OS 130; namely, as device feature assessor 144B and code rewriting component 146B.

When device driver 140 is initiated in computer system 100, conditional branch identifier 142 examines the code of the device driver to identify all conditional branches in the device driver 140. For each identified conditional branch, the conditional branch identifier 142 determines an associated device feature attached to the condition of the conditional branch. The identified conditions and corresponding device features can be stored (e.g., as a list) in device driver conditional branch data 115 in memory 110.

Any time a configuration change associated with the device driver 140 is detected, the device feature assessor 144A, 144B determines whether conditional branches of the device driver 140 can be changed to unconditional branches. A configuration change may refer to addition of a supported device 120 on the computer system 100, removal of a supported device 120 from the computer system 100, and/or update of a supported device on the computer system 100. In some implementations, the device driver 140 may include entry points that get called whenever a configuration change occurs on the computer system 100. Further details with respect to the operations of device feature assessor 144A, 144B are described further below with respect to FIG. 2.

Figure 2:
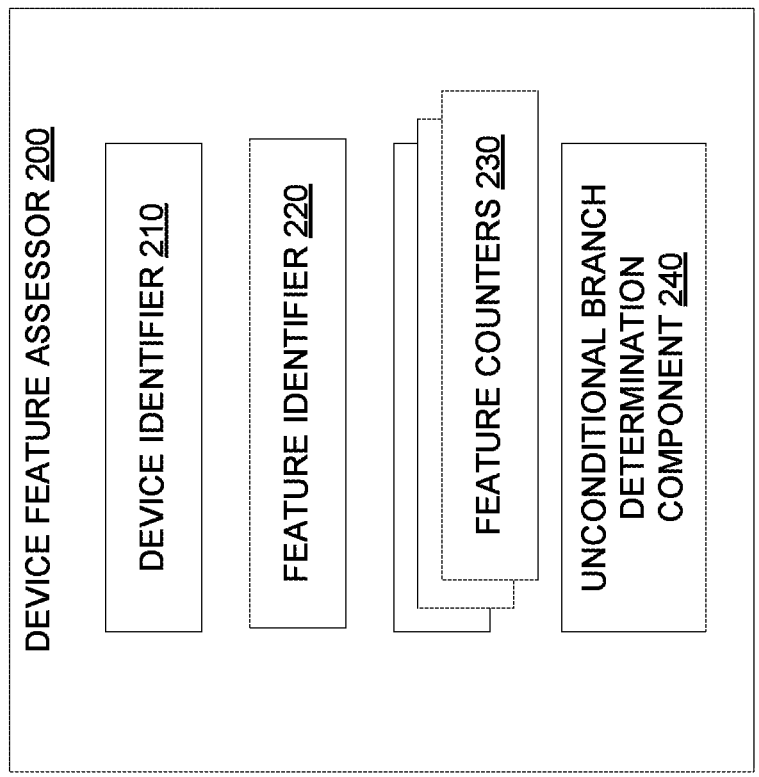
FIG. 2 schematically illustrates an example apparatus in which implementations of the disclosure may operate.

FIG. 2 is a block diagram of a device feature assessor 200 according to an implementation of the disclosure. In one implementation, device feature assessor 200 is the same as device feature assessor 144A or 144B as described with respect to FIG. 1. Device feature assessor 200 may include a device identifier 210, a feature identifier 220, feature counters 230, and an unconditional branch determination component 240.

Device feature assessor 200 utilizes device identifier 210 to identify the devices in computer system 200 that are supported by device driver 140. In some implementations, the OS 130 may include configuration information accessible by device identifier 210. In some implementations, device identifier 210 may communicate with the attached devices 120 to determine whether they are supported by device driver 140.

For each of the devices determined to be supported by the device driver 140 by device identifier 210, the feature identifier 220 then identifies which features, from the list of features maintained in device driver conditional branch data 115, are implemented by the device. In one implementation, feature counters 230 may be utilized to track how many devices implement a particular feature. For each condition of each conditional branch, a feature counter 230 is associated with the condition. For each feature identified by the feature identifier 220, the corresponding feature counter 230 for that feature is incremented. Implementations of the disclosure may utilize other structures for feature identification and assessment than feature counters 230, and are not limited to such a construct.

For each conditional branch of a device driver 140, the unconditional branch determination component 240 may determine whether all devices identified as supported by the device driver 140 implement the same feature of the conditional branch. In one implementation, the unconditional branch determination component 240 may utilize the feature counters 230 for this determination. As noted above, other techniques may also be utilized to determine whether all devices implement the same feature of the conditional branch.

In one example, the unconditional branch determination component 240 may identify the feature counters 230 corresponding to a conditional branch (e.g., if a conditional branch of the device driver 140 provides for 3 different possible feature implementations, then the 3 feature counters 230 associated with those 3 features would be identified). The unconditional branch determination component 240 then determines whether a single feature counter 230 from the identified feature counters 230 is at a non-zero value (while the other remaining feature counters 230 in the group are at a zero value). If so, this indicates that all devices currently operating in the system that are supported by the device driver 140 are implementing the same feature of the conditional branch.

If the unconditional branch determination component 240 determines that all devices identified as supported by the device driver 140 implement a same feature of the conditional branch, these sections of code corresponding to the particular conditional branch are re-written to unconditionally use the given feature. If it is determined that the devices implement different features of the conditional branch, then the sections of code are either left to execute the conditional branch (if they have not been previously re-written) and/or may be re-written to test the particular device feature and execute a branch. For example, consider the following pseudo-code representing an original version of device driver code:

if (device has feature X)
use feature X
else
use feature Y

If all devices have feature X, this can be re-written to:
if (1)
use feature X
else
use feature Y In the above re-written pseudo-code, the "1" causes the code to unconditionally branch the code to "use feature X".

If no devices have this feature (i.e., all devices have feature Y), the code may be re-written accordingly:
if (0)
use feature X
else
use feature Y In the above re-written pseudo-code, the "0" causes the code to unconditionally branch the code to "user feature Y".

In the case where there is a mix of devices with and without features, then the original code can be executed.

Referring back to FIG. 1, the code rewriting component 146A, 146B may cause the device driver 140 to be modified to generate executable code that includes unconditional branches when indicated by the device feature assessor 144A, 144B. Conversely, the code rewriting component 146A, 146B may cause the device driver 140 to be modified to generate executable code that includes conditional branches when indicated by the device feature assessor 144A, 144B (e.g., a device is added that implements a different feature of the conditional branch than the other devices 120 on the computer system 100).

Implementations of the disclosure support dynamic updates to the device driver 140 depending on a current device state of the computer system 100. For example, depending upon current device feature implementations in a computer system 100, the device driver 140 may either be optimized to execute unconditional branches or may be returned back to the conditional branch state prior to optimization (e.g., when a device is added that utilizes a feature of the conditional branch that is not used by the other devices in the computer system 100).

In some implementations, a static label infrastructure may be utilized by the code rewriting component 146A, 146B when optimizing the conditional branches in the device driver 140. The static label infrastructure provides support for modification of source code to implement a most likely condition in a conditional branch. In one implementation, the code rewriting component 146A, 146B works in conjunction with compiler 150 to cause the optimized executable code for the device driver 140 to be generated.

Figure 3:
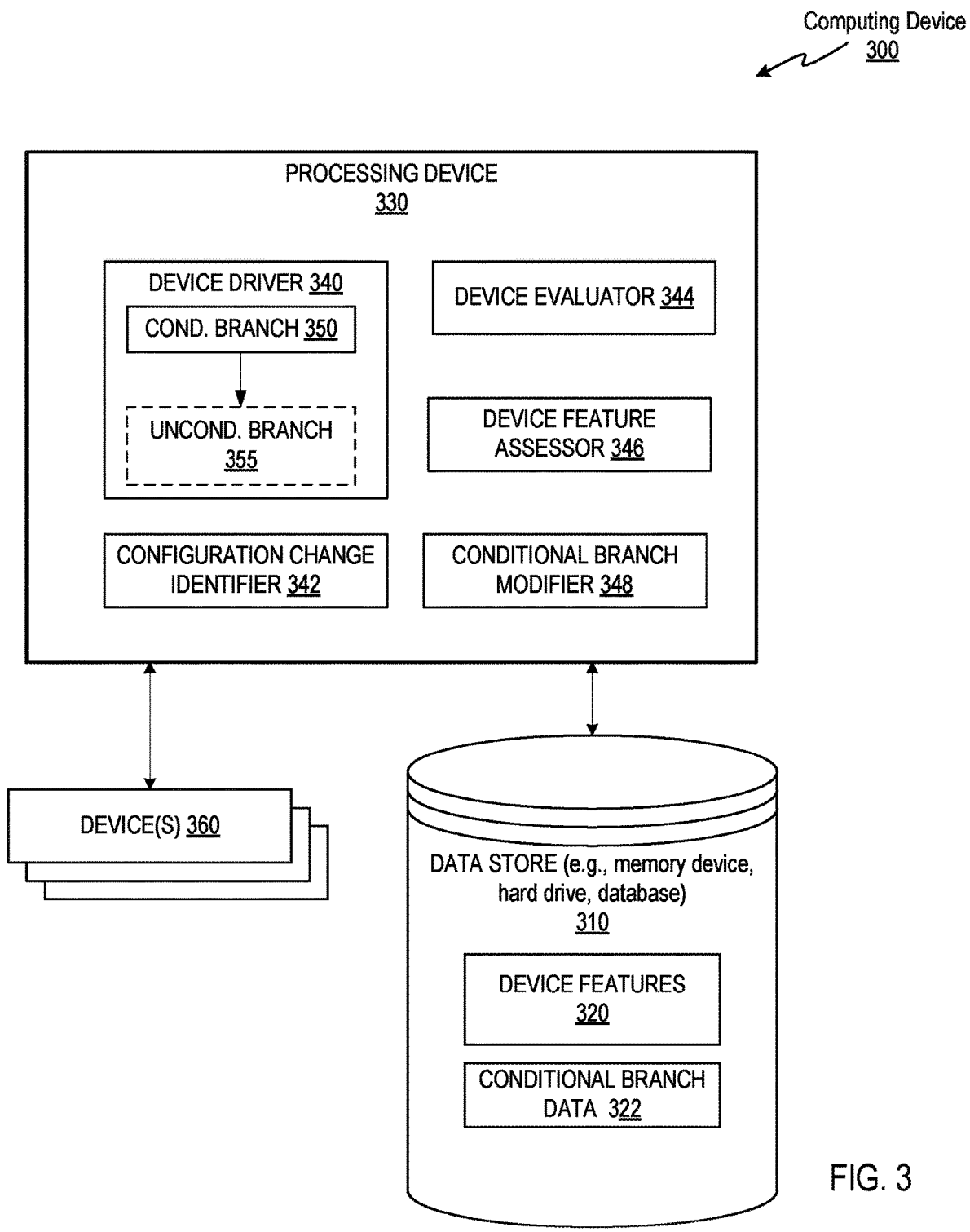
FIG. 3 is a block diagram of a device feature assessor for branch rewriting device feature optimization, in accordance with one or more aspects of the disclosure.

FIG. 3 illustrates an example computing device 300 in which implementations of the disclosure may operate. Computing device system 300 may be the same or similar to the computer system 100 described with respect to FIG. 1. Computing device 300 may include components and modules for branch rewriting device feature optimization. The computing device 300 may include a data store 310 and one or more devices 360. The data store 310 can store device features 320 and conditional branch data 322. The data store 310 may include any non-persistent data storage (e.g., memory), persistent data storage (e.g., flash storage, hard drive, tape), other medium, or combination thereof that is capable of storing instructions for carrying out the operations of the components and modules discussed herein. The devices 360 may include peripheral devices (e.g., display, mouse, printer, etc.), peripheral component interconnect (PCI) devices, and/or storage devices used by the computing device 300.

The computing device 300 may include a processing device 330 with a device driver 340, a configuration change identifier 342, a device evaluator 344, a device feature assessor 346, and a conditional branch modifier 348. The device driver 340 may include a one or more conditional branches 350 and/or unconditional branches 355.

The configuration change identifier 342 may identify an occurrence of a configuration change associated with the device driver 340 of the computing device 300. The device evaluator 344 may identify, in response to identification of the configuration change, one or more devices 360 supported by the device driver and identify features 320 implemented by each of the one or more devices 360. The device feature assessor 346 may determine, in view of the identifying the devices 360 and features 320, that a feature of the features 320 is implemented by each of the one or more devices 360. The feature 320 may correspond to a conditional branch 350 of the device driver 340. The conditional branch modifier 348 may modify, in response to determining that the feature 320 is implemented by each of the one or more devices 360, the conditional branch 350 corresponding to the feature to be an unconditional branch 355 in the device driver 340.

Figure 4:
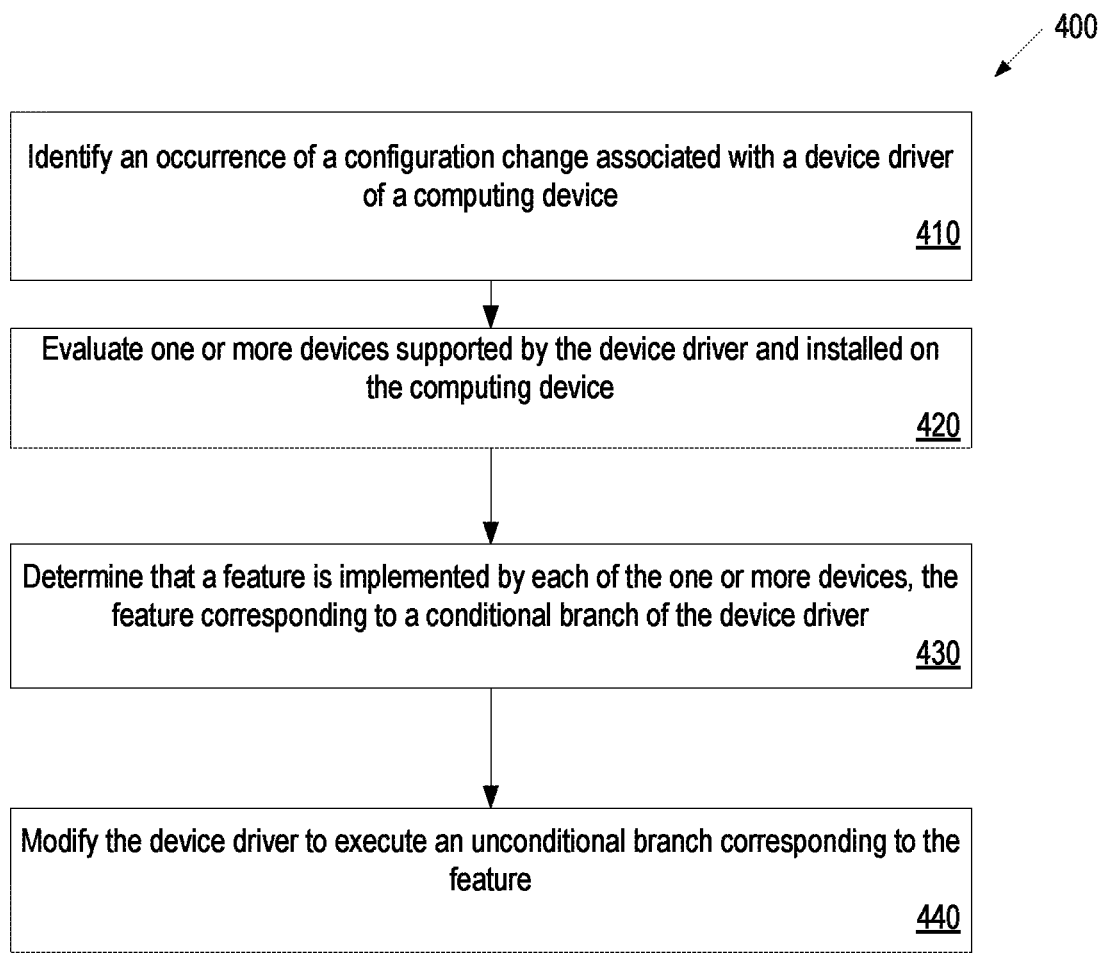
FIG. 4 depicts a flow diagram of a method of performing branch rewriting device feature optimization upon a configuration change, in accordance with one or more aspects of the disclosure.
Figure 5:
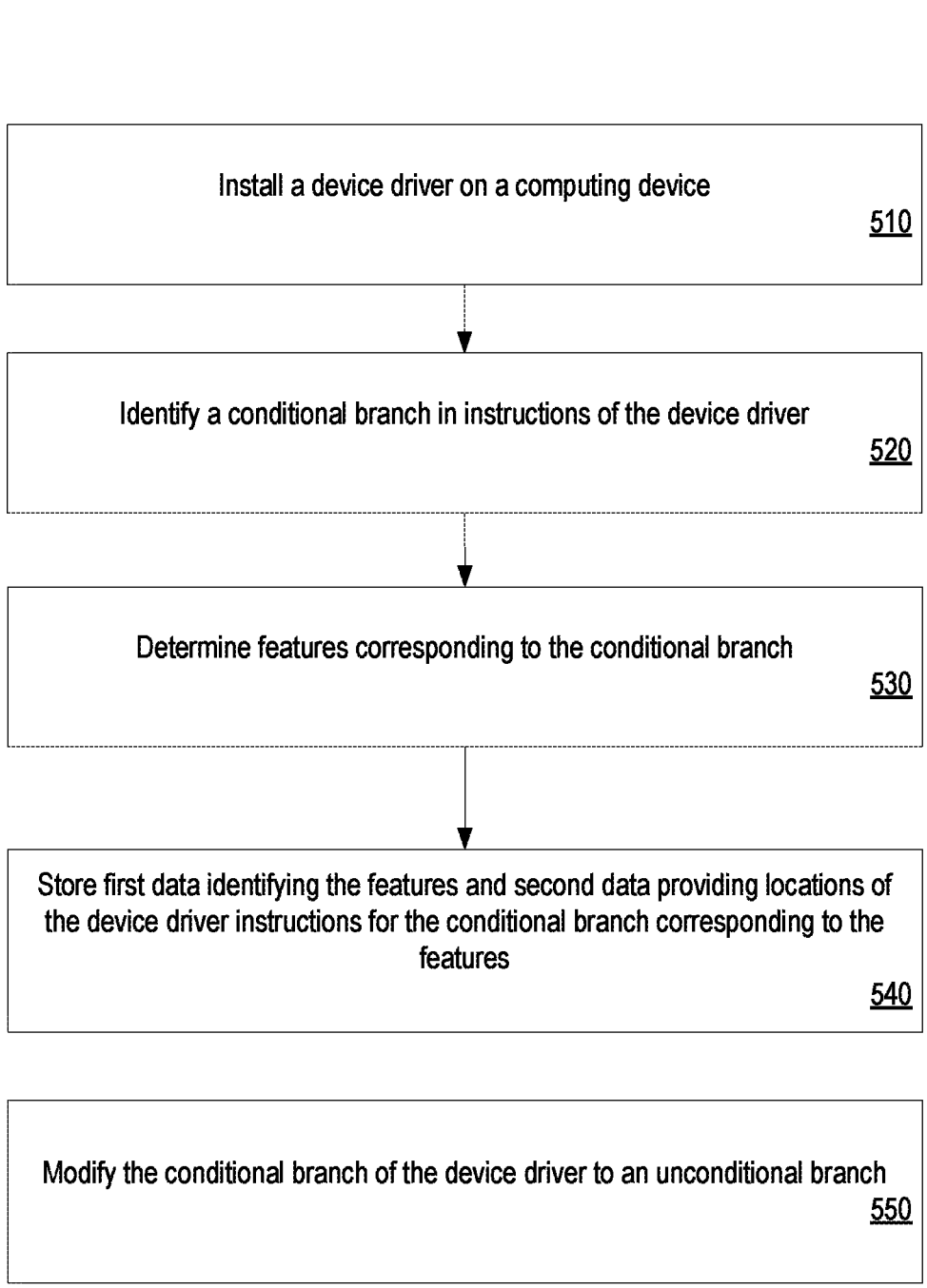
FIG. 5 depicts a flow diagram of a method of initializing a device driver to implement branch rewriting device feature optimization, in accordance with one or more aspects of the disclosure.

FIGS. 4 and 5 depict flow diagrams for illustrative examples of methods 400 and 500 for branch rewriting device feature optimization. Method 400 includes a method of performing branch rewriting device feature optimization upon a configuration change. Method 500 includes a method of initializing a device driver to implement branch rewriting device feature optimization. Methods 400 and 500 may be performed by processing devices that may comprise hardware (e.g., circuitry, dedicated logic), computer readable instructions (e.g., run on a general purpose computer system or a dedicated machine), or a combination of both. Methods 400 and 500 and each of their individual functions, routines, subroutines, or operations may be performed by one or more processors of the computer device executing the method. In certain implementations, methods 400, and 500 may each be performed by a single processing thread. Alternatively, methods 400 and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, method 400 may be performed by at least one of the device driver 140 or OS 130, as shown in FIG. 1. Method 400 may begin at block 410, where a processing device may identify an occurrence of a configuration change associated with a device driver of the computing device. The configuration change may include adding a device associated with the device driver, removing a device associated with the device driver, and/or updating a device associated with the device driver. At block 420, the processing device may evaluate one or more devices supported by the device driver and installed on the computing device. In one implementation, the evaluating is responsive to identification of the configuration change.

Subsequently, at block 430, the processing device may determine that a feature is implemented by each of the one or more devices, the feature corresponding to a conditional branch of the device driver. In one implementation, the determination that the feature is implemented by each of the one or more device is based on information obtained from the evaluation of the one or more devices. Lastly, at block 440, the processing device may modify the device driver to execute an unconditional branch for the feature. The modification of the device driver may be performed responsive to determining that the feature is implemented by each of the one or more device.

Referring to FIG. 5, method 500 may be performed by at least one of the device driver 140 or OS 130, as shown in FIG. 1. Method 500 may begin at block 510, where a processing device may install a device driver on a computing device. At block 520, the processing device may identify a conditional branch in instructions of the device driver. Subsequently, at block 530, the processing device may determine features corresponding to the conditional branch. In one implementation, the features are supported by the device driver for implementation in at least one device coupled to the computing device.

At block 540, the processing device may store first data identifying the features and second data providing locations of device driver instructions for the conditional branch corresponding to the features. Lastly, at block 550, the processing device may modify the conditional branch of the device driver to an unconditional branch. In one implementation, modification of the conditional branch is based on the first and second data and based on implementation of the features by the at least one device.

Figure 6:
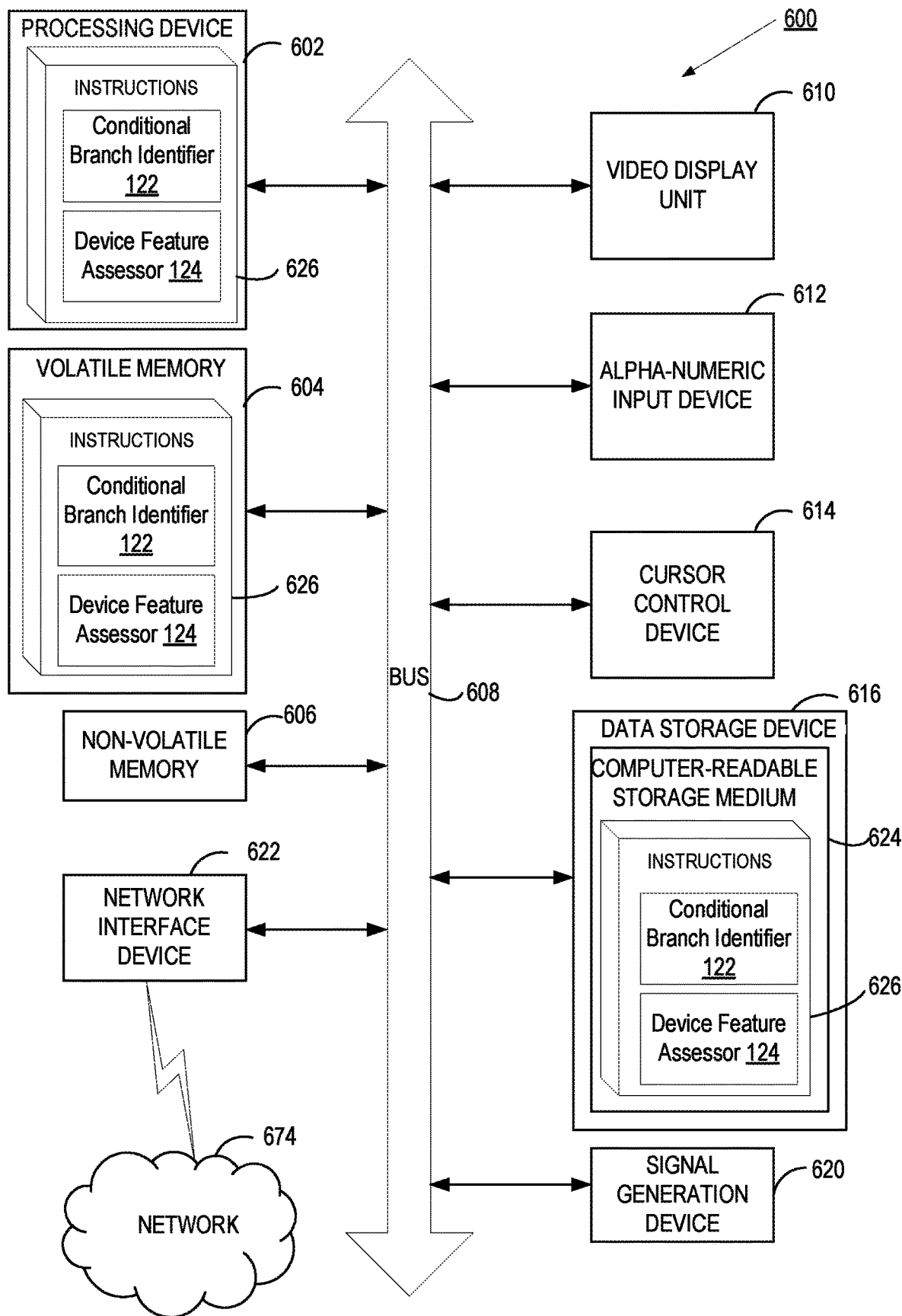
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device, such as computer system 100 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for a conditional branch identifier 142, a device feature assessor 144A, 144B, and/or a code rewriting component 146A, 146B of FIG. 1 for implementing methods 400 and/or 500 of FIGS. 4 and 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
identifying, by a processing device of a computing device, an occurrence of a configuration change associated with a device driver of the computing device;
responsive to identification of the configuration change, evaluating one or more devices supported by the device driver and installed on the computing device;
determining, in view of the evaluating, that a feature is implemented by each of the one or more devices, the feature corresponding to a conditional branch of the device driver, wherein determining that the feature is implemented further comprises referencing one or more feature counters corresponding to the conditional branch and maintained by the processing device; and
responsive to the determining, modifying the device driver to execute an unconditional branch corresponding the feature, wherein modifying the device driver comprises updating the conditional branch in code of the device driver to the unconditional branch.

2. The method of claim 1, wherein evaluating the one or more devices comprises identifying the one or more devices as associated with the device driver and identifying features implemented by each of the one or more devices.

3. The method of claim 1, wherein the feature corresponds to one of a plurality of variants corresponding to the conditional branch, and wherein each of the plurality of variants is associated with a counter of the one or more feature counters maintained by the processing device, the counter incremented responsive to implementation of the corresponding variant by at least one of the one or more devices.

4. The method of claim 3, wherein determining that the feature is implemented further comprises determining that a single counter of counters associated with the plurality of variants of the conditional branch is a non-zero value while all remaining counters associated with the plurality of variants of the conditional branch are a zero value.

5. The method of claim 1, wherein updating the conditional branch further comprises determining a location of device driver instructions for the feature and updating the device driver to unconditionally jump to the location of the device driver instructions for the feature.

6. The method of claim 5, further comprising referencing device driver conditional branch data maintained in the memory of the computing device to determine the location of the device driver instructions for the feature, the device driver conditional branch data to map the feature to the location of the device driver instructions for the feature.

7. The method of claim 6, wherein the device driver to populate the device driver conditional branch data with features associated with variants of conditional branches of the device driver and with identification of memory locations of code of the variants.

8. The method of claim 1, wherein the occurrence of the configuration change comprises at least one of adding a device associated with the device driver, removing a device associated with the device driver, or updating a device associated with the device driver.

9. The method of claim 1, further comprising:
identifying another occurrence of a configuration change associated with the device driver;
responsive to identification of the configuration change, evaluating the one or more devices supported by the device driver and installed on the computing device;
determining, in view of the evaluating, that the feature is no longer implemented by each of the one or more devices, the feature corresponding to the unconditional branch of the device driver; and
responsive to the determining, modifying the unconditional branch corresponding to the feature to be the conditional branch in the device driver.

10. An apparatus, comprising,
a memory; and
a processing device operatively coupled to the memory, the processing device to:
identify an occurrence of a configuration change associated with a device driver of the computing device;
responsive to identification of the configuration change, identify one or more devices supported by the device driver and identify features implemented by each of the one or more devices;
determine, in view of the evaluating, that a feature of the features is implemented by each of the one or more devices, the feature corresponding to a conditional branch of the device driver, wherein determining that the feature is implemented further comprises referencing one or more feature counters corresponding to the conditional branch and maintained by the processing device; and
responsive to determining that the feature is implemented by each of the one or more devices, modifying the conditional branch corresponding to the feature to be an unconditional branch in the device driver.

11. The apparatus of claim 10, wherein the feature corresponds to one of a plurality of variants corresponding to the conditional branch, and wherein each of the plurality of variants is associated with a counter of the one or more feature counters maintained by the processing device, the counter incremented responsive to implementation of the corresponding variant by at least one of the one or more devices.

12. The apparatus of claim 11, wherein the processing device to determine that the feature is implemented further comprises the processing device to determine that a single counter of counters associated with the plurality of variants of the conditional branch is a non-zero value while all remaining counters associated with the plurality of variants of the conditional branch are a zero value.

13. The apparatus of claim 10, wherein the processing device to modify the conditional branch further comprises the processing device to determine a location of device driver instructions for the feature and updating the device driver to unconditionally jump to the location of the device driver instructions for the feature.

14. The apparatus of claim 13, wherein the processing device is further to reference device driver conditional branch data maintained in the memory of the computing device to determine the location of the device driver instructions for the feature, the device driver conditional branch data to map the feature to the location of the device driver instructions for the feature.

15. The apparatus of claim 14, wherein the device driver to populate the device driver conditional branch data with features associated with variants of conditional branches of the device driver and with identification of memory locations of code of the variants.

16. A non-transitory machine-readable storage medium storing instructions that cause a processing device to:
install a device driver on a computing device;
identify a conditional branch in instructions of the device driver;
determine features corresponding to the conditional branch, the features supported by the device driver for implementation in at least one device coupled to the computing device;
store first data identifying the features and second data providing locations of device driver instructions for the conditional branch corresponding to the features; and
modify, based the first and second data and based on implementation of the features by the at least one device, the conditional branch of the device driver to an unconditional branch, wherein the implementation of the features is indicated via one or more feature counters corresponding to the conditional branch and maintained by the processing device.

17. The non-transitory machine-readable storage medium of claim 16, wherein the processing device to modify the conditional branch further comprises the processing device to update the device driver to unconditionally jump to the location of the device driver instructions for a first feature of the features, wherein each of the at least one devices supported by the device driver implements the first feature.

18. The non-transitory machine-readable storage medium of claim 16, wherein the processing device is further to reference device driver conditional branch data maintained in the memory of the computing device to determine the location of the device driver instructions for the first feature, the device driver conditional branch data to map the first feature to the location of the device driver instructions for the first feature.

19. The non-transitory machine-readable storage medium of claim 16, wherein the processing device to modify the conditional branch is based on an occurrence of a configuration change associated with the device driver, the configuration change comprising at least one of adding a device associated with the device driver, removing a device associated with the device driver, or updating a device associated with the device driver.

* * * * *